(12) United States Patent
Shah et al.

(10) Patent No.: US 8,158,217 B2
(45) Date of Patent: Apr. 17, 2012

(54) CNT-INFUSED FIBER AND METHOD THEREFOR

(75) Inventors: Tushar K. Shah, Columbia, MD (US); Slade H. Gardner, Fort Worth, TX (US); Mark R. Alberding, Glen Arm, MD (US)

(73) Assignee: Applied Nanostructured Solutions, LLC, Baltimore, MD (US)

( * ) Notice: Subject to any disclaimer, the term of this patent is extended or adjusted under 35 U.S.C. 154(b) by 755 days.

(21) Appl. No.: 11/619,327

(22) Filed: Jan. 3, 2007

(65) Prior Publication Data
US 2010/0276072 A1    Nov. 4, 2010

(51) Int. Cl.
*H05H 1/24*    (2006.01)
*C23C 16/00*   (2006.01)

(52) U.S. Cl. .............. 427/577; 427/249.3; 427/249.1

(58) Field of Classification Search .............. 427/249.3, 427/249.4, 577
See application file for complete search history.

(56) References Cited

U.S. PATENT DOCUMENTS

| | | |
|---|---|---|
| 4,515,107 A | 5/1985 | Fournier et al. |
| 4,530,750 A | 7/1985 | Alsenberg et al. |
| 4,707,349 A | 11/1987 | Hjersted |
| 4,920,917 A | 5/1990 | Nakatani et al. |
| 5,093,155 A | 3/1992 | Miyazaki et al. |
| 5,130,194 A | 7/1992 | Baker et al. |
| 5,173,367 A | 12/1992 | Liimatta et al. |
| 5,221,605 A | 6/1993 | Bard et al. |
| 5,238,808 A | 8/1993 | Bard et al. |
| 5,246,794 A | 9/1993 | Blomgren et al. |
| 5,310,687 A | 5/1994 | Bard et al. |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,639,984 A | 6/1997 | Nielson |
| 5,714,089 A | 2/1998 | Bard et al. |
| 5,731,147 A | 3/1998 | Bard et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |

(Continued)

FOREIGN PATENT DOCUMENTS

CN    101698975    4/2010

(Continued)

OTHER PUBLICATIONS

Wang et al., "Processing and Property Investigation of Single-Walled Carbon Nanotube (SWNT) Buckypaper/Epoxy Resin Matrix Nanocomposit", "Composites Part A: applied science and manufacturing", Oct. 1, 2004, pp. 1225-1232, Publisher: Elsevier Science Publishers B.V., Published in: NL.

(Continued)

*Primary Examiner* — Kelly M Gambetta
(74) *Attorney, Agent, or Firm* — McDermott Will & Emery, LLP

(57) ABSTRACT

A carbon nanotube-infused fiber and a method for its production are disclosed. Nanotubes are synthesized directly on a parent fiber by first applying a catalyst to the fiber. The properties of the carbon nanotube-infused fiber will be a combination of those of the parent fiber as well as those of the infused carbon nanotubes.

17 Claims, 3 Drawing Sheets

U.S. PATENT DOCUMENTS

| | | |
|---|---|---|
| 6,184,280 B1 | 2/2001 | Shibuta |
| 6,221,154 B1 | 4/2001 | Lee et al. |
| 6,232,706 B1 | 5/2001 | Dai et al. |
| 6,251,520 B1 * | 6/2001 | Blizzard et al. ............... 428/375 |
| 6,331,209 B1 | 12/2001 | Jang et al. |
| 6,333,016 B1 | 12/2001 | Resasco et al. |
| 6,361,861 B2 | 3/2002 | Gao et al. |
| 6,413,487 B1 | 7/2002 | Resasco et al. |
| 6,420,293 B1 | 7/2002 | Chang et al. |
| 6,455,021 B1 | 9/2002 | Saito |
| 6,465,057 B1 | 10/2002 | Nakahigashi et al. |
| 6,479,028 B1 | 11/2002 | Kaner et al. |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,653,619 B2 | 11/2003 | Chin et al. |
| 6,673,392 B2 | 1/2004 | Lee et al. |
| 6,692,717 B1 | 2/2004 | Smalley et al. |
| 6,765,949 B2 | 7/2004 | Chang |
| 6,790,425 B1 | 9/2004 | Smalley et al. |
| 6,818,821 B2 | 11/2004 | Fujieda et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,934,600 B2 | 8/2005 | Jang et al. |
| 6,936,653 B2 | 8/2005 | McElrath et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,074,294 B2 | 7/2006 | Dubrow |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Den et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,211,320 B1 | 5/2007 | Cooper et |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,294,302 B2 | 11/2007 | Koide et al. |
| 7,329,698 B2 | 2/2008 | Noguchi et al. |
| 7,338,684 B1 | 3/2008 | Curliss et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,419,601 B2 | 9/2008 | Cooper et al. |
| 7,431,965 B2 | 10/2008 | Grigorian et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 2002/0035170 A1 | 3/2002 | Glatkowski et al. |
| 2002/0085968 A1 | 7/2002 | Smalley et al. |
| 2003/0042147 A1 | 3/2003 | Talin et al. |
| 2003/0102585 A1 | 6/2003 | Poulin et al. |
| 2003/0111333 A1 | 6/2003 | Montgomery et al. |
| 2004/0007955 A1 | 1/2004 | Yaniv et al. |
| 2004/0026234 A1 | 2/2004 | Vanden Brande et al. |
| 2004/0082247 A1 | 4/2004 | Desai et al. |
| 2004/0105807 A1 | 6/2004 | Fan et al. |
| 2004/0184981 A1 | 9/2004 | Liu et al. |
| 2004/0245088 A1 * | 12/2004 | Gardner ............... 204/173 |
| 2004/0253167 A1 | 12/2004 | Silva et al. |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0119371 A1 | 6/2005 | Drzal et al. |
| 2005/0172370 A1 | 8/2005 | Haq et al. |
| 2005/0176329 A1 * | 8/2005 | Olry et al. ............... 442/388 |
| 2005/0188727 A1 | 9/2005 | Greywall |
| 2005/0260412 A1 * | 11/2005 | Gardner ............... 428/408 |
| 2005/0263456 A1 | 12/2005 | Cooper et al. |
| 2005/0287064 A1 | 12/2005 | Mayne et al. |
| 2006/0052509 A1 | 3/2006 | Saitoh |
| 2006/0062944 A1 | 3/2006 | Gardner et al. |
| 2006/0110599 A1 | 5/2006 | Honma et al. |
| 2006/0121275 A1 | 6/2006 | Poulin et al. |
| 2006/0159916 A1 | 7/2006 | Dubrow et al. |
| 2006/0177602 A1 | 8/2006 | Dijon et al. |
| 2006/0198956 A1 | 9/2006 | Eres |
| 2007/0020167 A1 | 1/2007 | Han et al. |
| 2007/0048521 A1 | 3/2007 | Istvan |
| 2007/0054105 A1 | 3/2007 | Hsiao |
| 2007/0092431 A1 | 4/2007 | Resasco et al. |
| 2007/0110977 A1 | 5/2007 | Al-Haik et al. |
| 2007/0128960 A1 | 6/2007 | Nejhad et al. |
| 2007/0135588 A1 | 6/2007 | Diakoumakos et al. |
| 2007/0189953 A1 | 8/2007 | Bai et al. |
| 2007/0259128 A1 | 11/2007 | Parsapour |
| 2008/0014431 A1 | 1/2008 | Lashmore et al. |
| 2008/0020193 A1 * | 1/2008 | Jang et al. ............... 428/292.1 |
| 2008/0048364 A1 | 2/2008 | Armeniades et al. |
| 2008/0053922 A1 | 3/2008 | Honsinger, Jr. et al. |
| 2008/0075954 A1 | 3/2008 | Wardle et al. |
| 2008/0118753 A1 | 5/2008 | Poulin et al. |

| | | |
|---|---|---|
| 2008/0160286 A1 | 7/2008 | Asrar et al. |
| 2008/0160302 A1 | 7/2008 | Asrar et al. |
| 2008/0170982 A1 | 7/2008 | Zhang et al. |
| 2008/0182108 A1 | 7/2008 | Curliss et al. |
| 2008/0187648 A1 | 8/2008 | Hart et al. |
| 2008/0247938 A1 | 10/2008 | Tsai et al. |
| 2008/0279753 A1 | 11/2008 | Harutyunyan |
| 2008/0286564 A1 | 11/2008 | Tsotsis |
| 2009/0017301 A1 | 1/2009 | Moireau |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0092832 A1 | 4/2009 | Moireau |
| 2009/0099016 A1 | 4/2009 | Carruthers et al. |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | DuFaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0286079 A1 | 11/2009 | Barker et al. |
| 2009/0294753 A1 | 12/2009 | Hauge et al. |
| 2009/0311166 A1 | 12/2009 | Hart et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0098931 A1 | 4/2010 | Daniel et al. |
| 2010/0099319 A1 | 4/2010 | Lashmore et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |

FOREIGN PATENT DOCUMENTS

| | | |
|---|---|---|
| IN | 01900DE2008 A | 3/2010 |
| KR | 100829001 | 5/2008 |
| TW | 200833861 | 8/2008 |
| WO | 03082733 | 10/2003 |
| WO | WO/2006/048531 A1 | 5/2006 |
| WO | WO/2006/115486 A1 | 11/2006 |
| WO | WO 2007/015710 | 2/2007 |
| WO | WO/2007/061854 A2 | 5/2007 |
| WO | WO/2007/089118 A1 | 8/2007 |
| WO | WO/2007/149109 A2 | 12/2007 |
| WO | WO/2008/041183 A2 | 4/2008 |
| WO | WO/2008/054541 A2 | 5/2008 |
| WO | WO/2008/085634 A1 | 7/2008 |
| WO | WO/2008/115640 A2 | 9/2008 |
| WO | WO 2009/004346 | 1/2009 |
| WO | 2009110885 | 9/2009 |

OTHER PUBLICATIONS

Lux, Rudolf, "PCT Application No. PCT/US2007/086875 Search Report and Written Opinion", May 13, 2008, Publisher: PCT, Published in: PCT.

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier. Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang, et al., "Penetration depth of atmospheric pressure plasma surface modification into multiple layers of polyester fabrics", Surface and Coatings Technology, 2007, pp. 77-83, vol. 202, Elsevier B.V.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elisevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al., "Carbon Nanotubes with a Triangular Cross-section, Fabricated Using Anodic Porous Alumina as the Temple", Adv. Mater., 204, pp. 429-432, vol. 16, No. 5, Wiley-VCH Verlag GmbH & Co. KGaA, Weinheim.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Kramer, et al., Constrained Iron Catalysts for Single-Walled Carbon Nanotube Growth?, Langmuir 2005, 21 8466-8470 [http://pubs.acs.org/dol/abs/10.1021/la0506729].

U.S. Appl. No. 12/766,817, filed Apr. 23, 2010.

U.S. Appl. No. 61/296,621, filed Jan. 15, 2010.

U.S. Appl. No. 61/297,704, filed Jan. 22, 2010.

Zhang et al., "Integration and characterization of aligned carbon nanotubes on metal/silicon substrates and effects of water", Applied Surface Science 255 (2009) 5003-5008, entire document.

* cited by examiner

CNT-INFUSED FIBER AND METHOD THEREFOR

FIELD OF THE INVENTION

The present invention relates to carbon nanotubes and fibers.

BACKGROUND OF THE INVENTION

Fibers are used for many different applications in a wide variety of industries, such as the commercial aviation, recreation, industrial and transportation industries. Commonly-used fibers for these and other applications include cellulosic fiber (e.g., viscose rayon, cotton, etc.), glass fiber, carbon fiber, and aramid fiber, to name just a few.

In many fiber-containing products, the fibers are present in the form of a composite material (e.g., fiberglass, etc.). A composite material is a heterogeneous combination of two or more constituents that differ in form or composition on a macroscopic scale. While the composite material exhibits characteristics that neither constituent alone possesses, the constituents retain their unique physical and chemical identities within the composite.

Two key constituents of a composite include a reinforcing agent and a resin matrix. In a fiber-based composite, the fibers are the reinforcing agent. The resin matrix keeps the fibers in a desired location and orientation and also serves as a load-transfer medium between fibers within the composite.

Fibers are characterized by certain properties, such as mechanical strength, density, electrical resistivity, thermal conductivity, etc. The fibers "lend" their characteristic properties, in particular their strength-related properties, to the composite. Fibers therefore play an important role in determining a composite's suitability for a given application.

To realize the benefit of fiber properties in a composite, there must be a good interface between the fibers and the matrix. This is achieved through the use of a surface coating, typically referred to as "sizing." The sizing provides an all important physico-chemical link between fiber and the resin matrix and thus has a significant impact on the mechanical and chemical properties of the composite. The sizing is applied to fibers during their manufacture.

Substantially all conventional sizing has lower interfacial strength than the fibers to which it's applied. As a consequence, the strength of the sizing and its ability to withstand interfacial stress ultimately determines the strength of the overall composite. In other words, using conventional sizing, the resulting composite cannot have a strength that is equal to or greater than that of the fiber.

SUMMARY OF THE INVENTION

The illustrative embodiment of the present invention is a carbon nanotube-infused ("CNT-infused") fiber.

In CNT-infused fiber disclosed herein, the carbon nanotubes are "infused" to the parent fiber. As used herein, the term "infused" means physically or chemically bonded and "infusion" means the process of physically or chemically bonding. The physical bond between the carbon nanotubes and parent fiber is believed to be due, at least in part, to van der Waals forces. The chemical bond between the carbon nanotubes and the parent fiber is believed to be a covalent bond.

Regardless of its true nature, the bond that is formed between the carbon nanotubes and the parent fiber is quite robust and is responsible for CNT-infused fiber being able to exhibit or express carbon nanotube properties or characteristics. This is in stark contrast to some prior-art processes, wherein nanotubes are suspended/dispersed in a solvent solution and applied, by hand, to fiber. Because of the strong van der Waals attraction between the already-formed carbon nanotubes, it is extremely difficult to separate them to apply them directly to the fiber. As a consequence, the lumped nanotubes weakly adhere to the fiber and their characteristic nanotube properties are weakly expressed, if at all.

The infused carbon nanotubes disclosed herein effectively function as a replacement for conventional "sizing." It has been found that infused carbon nanotubes are far more robust molecularly and from a physical properties perspective than conventional sizing materials. Furthermore, the infused carbon nanotubes improve the fiber-to-matrix interface in composite materials and, more generally, improve fiber-to-fiber interfaces.

The CNT-infused fiber disclosed herein is itself similar to a composite material in the sense that its properties will be a combination of those of the parent fiber as well as those of the infused carbon nanotubes. Consequently, embodiments of the present invention provide a way to impart desired properties to a fiber that otherwise lacks such properties or possesses them in insufficient measure. Fibers can therefore be tailored or engineered to meet the requirements of a specific application. In this fashion, the utility and value of virtually any type of fiber can be improved.

In accordance with the illustrative embodiment of a CNT-infused fiber-forming process, nanotubes are synthesized in place on the parent fiber itself. It is important that the carbon nanotubes are synthesized on the parent fiber. If not, the carbon nanotubes will become highly entangled and infusion does not occur. As seen from the prior art, non-infused carbon nanotubes impart little if any of their characteristic properties.

The parent fiber can be any of a variety of different types of fibers, including, without limitation: carbon fiber, graphite fiber, metallic fiber (e.g., steel, aluminum, etc.), ceramic fiber, metallic-ceramic fiber, glass fiber, cellulosic fiber, aramid fiber.

In the illustrative embodiment, nanotubes are synthesized on the parent fiber by applying or infusing a nanotube-forming catalyst, such as iron, nickel, cobalt, or a combination thereof, to the fiber.

In some embodiments, operations of the CNT-infusion process include:
  Removing sizing from the parent fiber;
  Applying nanotube-forming catalyst to the parent fiber;
  Heating the fiber to nanotube-synthesis temperature; and
  Spraying carbon plasma onto the catalyst-laden parent fiber.

In some embodiments, the infused carbon nanotubes are single-wall nanotubes. In some other embodiments, the infused carbon nanotubes are multi-wall nanotubes. In some further embodiments, the infused carbon nanotubes are a combination of single-wall and multi-wall nanotubes. There are some differences in the characteristic properties of single-wall and multi-wall nanotubes that, for some end uses of the fiber, dictate the synthesis of one or the other type of nanotube. For example, single-walled nanotubes can be excellent conductors of electricity while multi-walled nanotubes are not.

Methods and techniques for forming carbon nanotubes, as disclosed in co-pending U.S. patent application Ser. No. 10/455,767 (Publication No. US 2004/0245088) and which is incorporated herein by reference, can be adapted for use with the process described herein. In the illustrative embodiment, acetylene gas is ionized to create a jet of cold carbon plasma. The plasma is directed toward the catalyst-bearing parent fiber.

As previously indicated, carbon nanotubes lend their characteristic properties (e.g., exceptional mechanical strength, low to moderate electrical resistivity, high thermal conductivity, etc.) to the CNT-infused fiber. The extent to which the resulting CNT-infused fiber expresses these characteristics is a function of the extent and density of coverage of the parent fiber by the carbon nanotubes.

In a variation of the illustrative embodiment, CNT infusion is used to provide an improved filament winding process. In this variation, carbon nanotubes are formed on fibers (e.g., graphite tow, glass roving, etc.), as described above, and are then passed through a resin bath to produce resin-impregnated, CNT-infused fiber. After resin impregnation, the fiber is positioned on the surface of a rotating mandrel by a delivery head. The fiber then winds onto the mandrel in a precise geometric pattern in known fashion.

The filament winding process described above provides pipes, tubes, or other forms as are characteristically produced via a male mold. But the forms made from the filament winding process disclosed herein differ from those produced via conventional filament winding processes. Specifically, in the process disclosed herein, the forms are made from composite materials that include CNT-infused fibers. Such forms will therefore benefit from enhanced strength, etc., as provided by the CNT-infused fibers.

Any of a variety of different parent fibers can be used to form CNT-infused fiber, Of late, there has been a demand for carbon fiber forms that are compatible with a broad range of resins and processes. And the sizing material is an important determinant of this compatibility. For example, sizing is critically important for providing an even distribution of chopped carbon fiber in sheet molding compounds ("SMCs"), such as are used in some automotive body panels.

Notwithstanding this demand for carbon fiber and its potentially broad applicability, carbon fiber has historically been sized for compatibility with only epoxy resin. CNT-infused carbon fiber, as produced according to the method disclosed herein, addresses this problem by providing a fiber that is sized with infused nanotubes, which provides the desired broad applicability with a variety of resins and processes.

DETAILED DESCRIPTION

Figure 1:
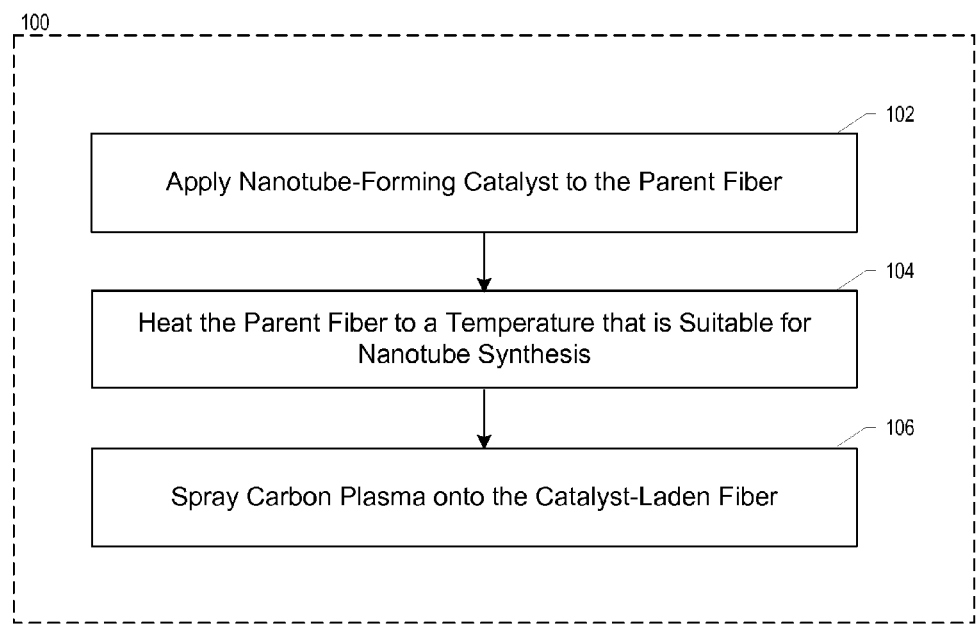
FIG. 1 depicts a method for producing CNT-infused fiber in accordance with the illustrative embodiment of the present invention.

The following terms are defined for use in this Specification, including the appended claims:

Carding—The process by which the fibers are opened out into an even film.

Carded Fibers—Fibers that have been carded which opens them up.

Cloth—A reinforcement material made by weaving strands of fiber yarns.

Continuous Filament Strand—A fiber bundle composed of many filaments. Also, when referring to gun roving; a collection of string-like fiber or yarn, which is fed through a chopper gun in a spray-up process.

Continuous Strand Roving—A bundle of filaments which are fed through a chopper gun in a spray-up process.

Fabric—A planar textile structure produced by interlacing yarns, fibers, or filaments.

Fiber—A unit of matter, either natural, or manufactured, which forms the basic element of fabrics and other textile structures.

Fiber orientation—Fiber alignment in a non-woven or a mat laminate where the majority of fibers are in the same direction, resulting in a higher strength in that direction.

Fiber Pattern—Visible fibers on the surface of laminates or moldings; the thread size and weave of glass cloth.

Filament—A single fiber of an indefinite or extreme length, either natural (e.g., silk, etc.) or manufactured. Typically microns in diameter, manufactured fibers are extruded into filaments that are converted into filament yarn, staple, or tow.

Filament Winding—A process which involves winding a resin-saturated strand of glass filament around a rotating mandrel.

Filament Yarn—A yarn composed of continuous filaments assembled with, or without twist.

Infuse—To form a chemical bond.

Male Mold—A convex mold where the concave surface of the part is precisely defined by the mold surface.

Matrix—The liquid component of a composite or laminate.

Mandrel—The core around which paper-, fabric-, or resin-impregnated fiber is wound to form pipes, tubes, or vessels; in extrusion, the central finger of a pipe or tubing die.

Pultrusion—Reversed "extrusion" of resin-impregnated roving in the manufacture of rods, tubes and structural shapes of a permanent cross-section. The roving, after passing through the resin dip tank, is drawn through a die to form the desired cross-section.

Resin—A liquid polymer that, when catalyzed, cures to a solid state.

Roving—The soft strand of carded fiber that has been twisted, attenuated, and freed of foreign matter preparatory to spinning.

Sizing—A surface treatment that is applied to filaments immediately after their formation for the purpose of promoting good adhesion between those filaments and the matrix, to the extent the filaments are to be used as the reinforcing agent in a composite material.

Spray-up—The process of spraying fibers, resin and catalyst simultaneously into a mold using a chopper gun.

Strands—A primary bundle of continuous filaments (or slivers) combined in a single compact unit without twist. These filaments (usually 51, 102 or 204) are gathered together in the forming operations.

Tape—a narrow-width reinforcing fabric or mat.

Tow—a loose strand of filaments without twist.

Twist—A term that applies to the number of turns and the direction that two yarns are turned during the manufacturing process.

Woven Roving Fabric—Heavy fabrics woven from continuous filament in roving form. Usually in weights between 18-30 oz. per square yard.

Yarn—A generic term for a continuous strand of textile fibers, filaments, or material in a form suitable for knitting, weaving, braiding, or otherwise intertwining to form a textile fabric.

As the definitions that are provided above indicate, terms such as "fiber," "filament," "yarn," etc., have distinct meanings. But for the purposes of the specification and the appended claims, and unless otherwise indicated, the term "fiber" is used in this specification as a generic term to refer to filament, yarn, tow, roving, fabric, etc., as well as fiber itself. The phrase "CNT-infused fiber" is therefore understood to encompass "CNT-infused fiber," "CNT-infused filament," "CNT-infused tow," "CNT-infused roving," etc.

FIG. 1 depicts a flow diagram of process 100 for producing CNT-infused fiber in accordance with the illustrative embodiment of the present invention.

Process 100 includes the operations of:
102: Applying nanotube-forming catalyst to the parent fiber.
104: Heating the parent fiber to a temperature that is sufficient for carbon nanotube synthesis.
106: Spraying carbon plasma onto the catalyst-laden parent fiber.

To infuse carbon nanotubes into a parent fiber, the carbon nanotubes are synthesized directly on the parent fiber. In the illustrative embodiment, this is accomplished by disposing nanotube-forming catalyst on the parent fiber, as per operation 102. Suitable catalysts for carbon nanotube formation include, without limitation, transition metal catalysts (e.g., iron, nickel, cobalt, combinations thereof, etc.).

Figure 2:
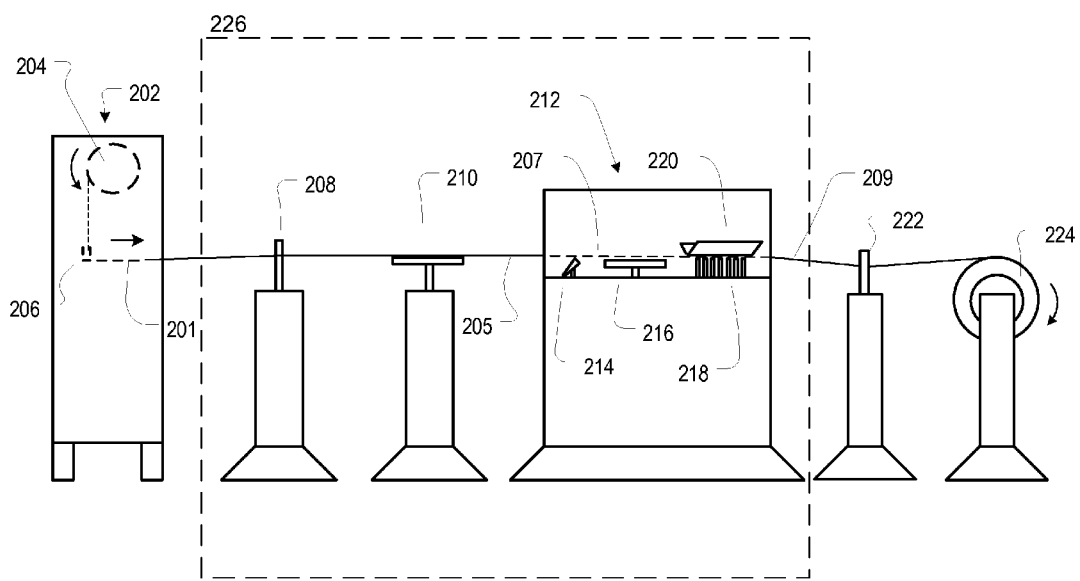
FIG. 2 depicts a system for implementing the illustrative method for producing CNT-infused fiber.

As described further in conjunction with FIG. 2, the catalyst is prepared as a liquid solution that contains nano-sized particles of catalyst. The diameters of the synthesized nanotubes are related to the size of the metal particles.

In the illustrative embodiment, carbon nanotube synthesis is based on a plasma-enhanced chemical vapor deposition process and occurs at elevated temperatures. The temperature is a function of catalyst, but will typically be in a range of about 500 to 1000° C. Accordingly, operation 104 requires heating the parent fiber to a temperature in the aforementioned range to support carbon nanotube synthesis.

In operation 106, carbon plasma is sprayed onto the catalyst-laden parent fiber. The plasma can be generated, for example, by passing a carbon containing gas (e.g., acetylene, ethylene, ethanol, etc.) through an electric field that is capable of ionizing the gas.

Nanotubes grow at the sites of the metal catalyst. The presence of the strong plasma-creating electric field can affect nanotube growth. That is, the growth tends to follow the direction of the electric field. By properly adjusting the geometry of the plasma spray and electric field, vertically-aligned carbon nanotubes (i.e., perpendicular to the fiber) are synthesized. Under certain conditions, even in the absence of a plasma, closely-spaced nanotubes will maintain a vertical growth direction resulting in a dense array of tubes resembling a carpet or forest.

FIG. 2 depicts system 200 for producing CNT-infused fiber in accordance with the illustrative embodiment of the present invention. System 200 includes fiber payout and tensioner station 202, fiber spreader station 208, sizing removal station 210, CNT-infusion station 212, fiber bundler station 222, and fiber uptake bobbin 224, interrelated as shown.

Payout and tension station 202 includes payout bobbin 204 and tensioner 206. The payout bobbin delivers fiber 201 to the process; the fiber is tensioned via tensioner 206.

Fiber 201 is delivered to fiber spreader station 208. The fiber spreader separates the individual elements of the fiber. Various techniques and apparatuses can be used to spread fiber, such as pulling the fiber over and under flat, uniform-diameter bars, or over and under variable-diameter bars, or over bars with radially-expanding grooves and a kneading roller, over a vibratory bar, etc. Spreading the fiber enhances the effectiveness of downstream operations, such as catalyst application and plasma application, by exposing more fiber surface area.

Payout and tension station 202 and fiber spreader station 208 are routinely used in the fiber industry; those skilled in the art will be familiar with their design and use.

Fiber 201 then travels to sizing removal station 210. At this station, any "sizing" that is on fiber 201 is removed. Typically, removal is accomplished by burning the sizing off of the fiber. Any of a variety of heating means can be used for this purpose, including, without limitation, an infrared heater, a muffle furnace, etc. Generally, non-contact heating methods are preferred. In some alternative embodiments, sizing removal is accomplished chemically.

The temperature and time required for burning off the sizing vary as a function of (1) the sizing material (e.g., silane, etc.); and (2) the identity of parent fiber 201 (e.g., glass, cellulosic, carbon, etc.). Typically, the burn-off temperature is a minimum of about 650° C. At this temperature, it can take as long as 15 minutes to ensure a complete burn off of the sizing. Increasing the temperature above a minimum burn temperature should reduce burn-off time. Thermogravimetric analysis can be used to determine minimum burn-off temperature for sizing.

In any case, sizing removal is the slow step in the overall CNT-infusion process. For this reason, in some embodiments, a sizing removal station is not included in the CNT-infusion process proper; rather, removal is performed separately (e.g., in parallel, etc.). In this way, an inventory of sizing-free fiber can be accumulated and spooled for use in a CNT-infused fiber production line that does not include a fiber removal station). In such embodiments, sizing-free fiber is spooled in payout and tension station 202. This production line can be operated at higher speed than one that includes sizing removal.

Sizing-free fiber 205 is delivered to CNT-infusion station 212, which is the "heart" of the process and system depicted in FIG. 2. Station 212 includes catalyst application station 214, fiber pre-heater station 216, plasma spray station 218, and fiber heaters 220.

As depicted in FIG. 2, sizing-free fiber 205 proceeds first to catalyst application station 214. In some embodiments, fiber 205 is cooled prior to catalyst application.

In some embodiments, the nanotube-forming catalyst is a liquid solution of nanometer-sized particles (e.g., 10 nanometers in diameter, etc.) of a transition metal. Typical transition metals for use in synthesizing nanotubes include, without limitation, iron, iron oxide, cobalt, nickel, or combinations thereof. These transition metal catalysts are readily commercially available from a variety of suppliers, including Ferrotech of Nashua, N.H. The liquid is a solvent such as toluene, etc.

In the illustrative embodiment, the catalyst solution is sprayed, such as by air sprayer 214, onto fiber 205. In some other embodiments, the transition metal catalyst is deposited on the parent fiber using evaporation techniques, electrolytic deposition techniques, suspension dipping techniques and other methods known to those skilled in the art. In some further embodiments, the transition metal catalyst is added to the plasma feedstock gas as a metal organic, metal salt or other composition promoting gas phase transport. The catalyst can be applied at room temperature in the ambient environment (neither vacuum nor an inert atmosphere is required).

Catalyst-laden fiber 207 is then heated at fiber preheater station 216. For the infusion process, the fiber should be heated until it softens. Generally, a good estimate of the softening temperature for any particular fiber is readily obtained from reference sources, as is known to those skilled in the art. To the extent that this temperature is not a priori known for a particular fiber, it can be readily determined by experimentation. The fiber is typically heated to a temperature that is in the range of about 500 to 1000° C. Any of a variety of heating elements can be used as the fiber preheater, such as, without limitation, infrared heaters, a muffle furnace, and the like.

After preheating, fiber 207 is finally advanced to plasma spray station having spray nozzles 218. A carbon plasma is generated, for example, by passing a carbon containing gas (e.g., acetylene, ethylene, ethanol, etc.) through an electric field that is capable of ionizing the gas. This cold carbon plasma is directed, via spray nozzles 218, to fiber 207. The fiber is disposed within about 1 centimeter of the spray nozzles to receive the plasma. In some embodiments, heaters 220 are disposed above fiber 207 at the plasma sprayers to maintain the elevated temperature of the fiber.

After CNT-infusion, CNT-infused fiber 209 is re-bundled at fiber bundler 222. This operation recombines the individual strands of the fiber, effectively reversing the spreading operation that was conducted at station 208.

The bundled, CNT-infused fiber 209 is wound about uptake fiber bobbin 224 for storage. CNT-infused fiber 209 is then ready for use in any of a variety of applications, including, without limitation, for use as the reinforcing material in composite materials.

It is noteworthy that some of the operations described above should be conducted under inert atmosphere or vacuum, such that environmental isolation is required. For example, if sizing is being burned off of the fiber, the fiber must be environmentally isolated to contain off-gassing and prevent oxidation. Furthermore, the infusion process should be conducted under an inert atmosphere (e.g., nitrogen, argon, etc.) to prevent oxidation of the carbon. For convenience, in some embodiments of system 200, environmental isolation is provided for all operations, with the exception of fiber payout and tensioning (at the beginning of the production line) and fiber uptake (at the end of the production line).

Figure 3:
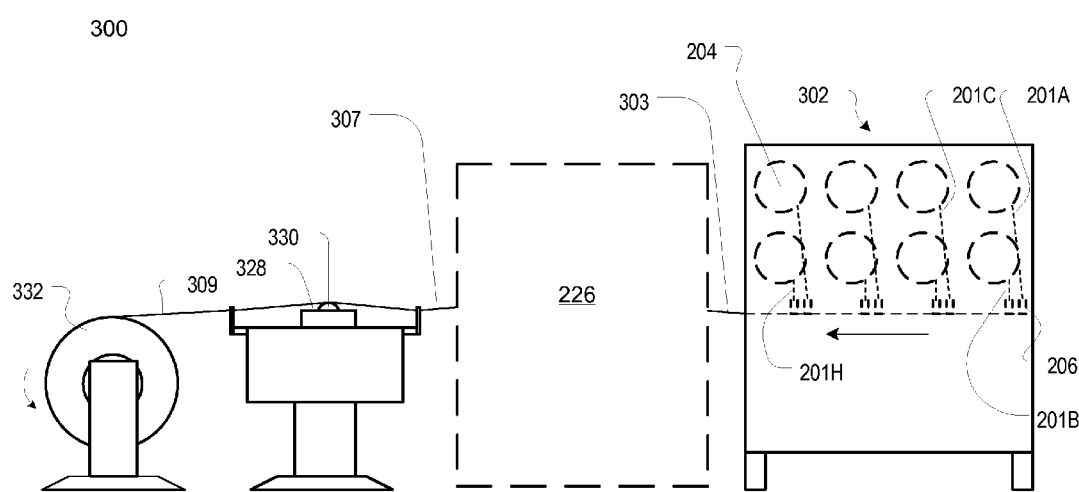
FIG. 3 depicts a system for filament winding in accordance with a variation of the illustrative embodiment.

FIG. 3 depicts a further embodiment of the invention wherein CNT-infused fiber is created as a sub-operation of a filament winding process being conducted via filament winding system 300.

System 300 comprises fiber creel 302, carbon nanotube infusion section 226, resin bath 328, and filament winding mandrel 332, interrelated as shown. The various elements of system 300, with the exception of carbon nanotube infusion section 226, are present in conventional filament winding processes. Again, the "heart" of the process and system depicted in FIG. 3 is the carbon nanotube infusion section 226, which includes fiber spreader station 208, (optional) sizing-removal station 210, and CNT-infusion station 212.

Fiber creel 302 includes plural spools 204 of parent fiber 201A through 201H. The untwisted group of fibers 201A through 201H is referred to collectively as "tow 303." Note that the term "tow" generally refers to a group of graphite fibers and the term "roving" usually refers to glass fibers. Here, the term "tow" is meant to refer, generically, to any type of fiber.

In the illustrative embodiment, creel 302 holds spools 204 in a horizontal orientation. The fiber from each spool 206 moves through small, appropriately situated rollers/tensioners 206 that change the direction of the fibers as they move out of creel 302 and toward carbon nanotube infusion section 226.

It is understood that in some alternative embodiments, the spooled fiber that is used in system 300 is CNT-infused fiber (i.e., produced via system 200). In such embodiments, system 300 is operated without nanotube infusion section 226.

In carbon nanotube infusion section 226, tow 303 is spread, sizing is removed, nanotube-forming catalyst is applied, the tow is heated, and carbon plasma is sprayed on the fiber, as described in conjunction with FIG. 2.

After passing through nanotube infusion section 226, CNT-infused tow 307 is delivered to resin bath 328. The resin bath contains resin for the production of a composite material comprising the CNT-infused fiber and the resin. Some important commercially-available resin-matrix families include general purpose polyester (e.g., orthophthalic polyesters, etc.), improved polyester (e.g., isophthalic polyesters, etc.), epoxy, and vinyl ester.

Resin bath can be implemented in a variety of ways, two of which are described below. In the illustrative embodiment, resin bath 328 is implemented as a doctor blade roller bath wherein a polished rotating cylinder (e.g., cylinder 330) that is disposed in the bath picks up resin as it turns. The doctor bar (not depicted in FIG. 3) presses against the cylinder to obtain a precise resin film thickness on cylinder 330 and pushes excess resin back into the bath. As fiber tow 307 is pulled over the top of cylinder 330, it contacts the resin film and wets out. In some other embodiments, resin bath 328 is realized as an immersion bath wherein fiber tow 307 is simply submerged into resin and then pulled through a set of wipers or roller that remove excess resin.

After leaving resin bath 328, resin-wetted, CNT-infused fiber tows 309 is passed through various rings, eyelets and, typically, a multi-pin "comb" (not depicted) that is disposed behind a delivery head (not depicted). The comb keeps the fiber tows 2309 separate until they are brought together in a single combined band on rotating mandrel 332.

Example

A CNT-infused carbon fiber was formed in accordance with the illustrative embodiment. A current was passed through carbon fiber (the parent fiber) to heat it to approximately 800° C. to remove epoxy sizing material. The fiber was then cooled to room temperature and left clamped between electrodes. A ferro-fluid catalyst was applied to the fiber using an aerosol spray technique. The fiber was allowed to dry and the chamber was closed, evacuated and filled with argon. A current was passed through the carbon fiber again to heat it to approximately 800 C for carbon nanotube synthesis. A carbon plasma was generated from acetylene precursor using 13.56 MHz microwave energy using an atmospheric pressure plasma jet. The carrier gas in the plasma jet was helium at 20 standard liters per minute (slm) and the argon was provided at 1.2 slm. The plasma jet was fixtured to a robotic motion control system allowing the plasma jet to move over the length of the fiber at a speed between 6 and 12 inches per minute. The CNT-infused fiber was then cooled to room temperature and removed from the chamber. Scanning Electron Microscopy showed carbon nanotube formation on the surface of the parent carbon fiber.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method of infusing carbon nanotubes on a parent fiber, the method comprising:
    spreading said parent fiber before disposing a carbon nanotube-forming catalyst on a surface of said parent fiber, thereby forming a catalyst-laden fiber;
    actively heating said catalyst-laden fiber to a nanotube-synthesis temperature;
    transporting said catalyst-laden fiber through a carbon plasma at atmospheric pressure, thereby synthesizing carbon nanotubes directly on said catalyst-laden fiber while being transported; and
    re-bundling the spread parent fiber after synthesizing carbon nanotubes thereon.

2. The method of claim 1 further comprising removing a sizing material from said parent fiber before disposing said catalyst on said parent fiber.

3. The method of claim 1 wherein said catalyst is a transition metal catalyst.

4. The method of claim 1 wherein the operation of disposing said catalyst on said parent fiber further comprises:
    forming a solution of said catalyst in a liquid; and
    spraying said solution on to said parent fiber.

5. The method of claim 1, wherein actively heating said catalyst-laden fiber comprises heating said catalyst-laden fiber to a softening temperature.

6. The method of claim 1, wherein actively heating said catalyst-laden fiber comprises heating said catalyst-laden fiber to a temperature that is between about 500° C. and 1000° C.

7. The method of claim 1 wherein said parent fiber is a carbon fiber and wherein actively heating said catalyst-laden fiber comprises heating to about 800° C.

8. The method of claim 1 further comprising applying resin to said carbon nanotube-infused fiber.

9. The method of claim 8 further comprising winding said carbon nanotube-infused fiber about a mandrel after applying said resin.

10. The method of claim 8 wherein said parent fiber is selected from the group consisting of graphite tow and glass roving.

11. The method of claim 1 further comprising synthesizing a first amount of said carbon nanotubes on said parent fiber, wherein said first amount is selected so that said carbon nanotube-infused fiber exhibits a second group of properties that differ from a first group of properties exhibited by said parent fiber.

12. The method of claim 11 wherein said first group of properties and said second group of properties include at least some of the same properties, and further wherein a value of at least one of said same properties differs between said first group and said second group.

13. The method of claim 11 wherein said second group of properties of said carbon nanotube-infused fiber includes a property that is not included among said first group of properties exhibited by said parent fiber.

14. The method of claim 1 further comprising depositing a first amount of said carbon nanotubes, wherein said first amount is selected so that a value of at least one property selected from the group consisting of tensile strength, Young's Modulus, density, electrical conductivity, and thermal conductivity of said carbon nanotube-infused fiber differs from a value of said at least one property of said parent fiber.

15. A method of infusing carbon nanotubes on a parent fiber having a sizing material, the method comprising:
    removing sizing material from said parent fiber;
    spreading said parent fiber before applying a carbon nanotube-forming catalyst on a surface of said parent fiber after sizing material removal, thereby forming a catalyst-laden fiber;
    heating said catalyst-laden fiber to at least 500° C.;
    synthesizing carbon nanotubes on said catalyst-laden fiber while the catalyst-laden fiber is being transported; and
    re-bundling the spread parent fiber after synthesizing carbon nanotubes thereon.

16. The method of claim 1, wherein the carbon nanotubes are covalently bonded to the parent fiber.

17. The method of claim 1, further comprising:
    generating the carbon plasma by passing a carbon containing gas through an electric field that is capable of ionizing the gas.

* * * * *